US008522199B2

(12) United States Patent
Beveridge et al.

(10) Patent No.: US 8,522,199 B2
(45) Date of Patent: Aug. 27, 2013

(54) SYSTEM, METHOD, AND COMPUTER PROGRAM PRODUCT FOR APPLYING A REGULAR EXPRESSION TO CONTENT BASED ON REQUIRED STRINGS OF THE REGULAR EXPRESSION

(75) Inventors: David Neill Beveridge, Beaverton, OR (US); Cedric Cochin, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 763 days.

(21) Appl. No.: 12/714,324

(22) Filed: Feb. 26, 2010

(65) Prior Publication Data
US 2012/0311529 A1 Dec. 6, 2012

(51) Int. Cl.
*G06F 9/44* (2006.01)

(52) U.S. Cl.
USPC .......................... 717/107; 717/106; 717/108

(58) Field of Classification Search
USPC ......................... 717/106, 107, 108
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,249,605 | B1 * | 6/2001 | Mao et al. ..................... 382/186 |
| 6,460,050 | B1 | 10/2002 | Pace et al. |
| 6,785,677 | B1 * | 8/2004 | Fritchman ............................ 1/1 |
| 6,892,237 | B1 * | 5/2005 | Gai et al. ....................... 709/224 |
| 7,093,023 | B2 * | 8/2006 | Lockwood et al. ........... 709/231 |
| 7,225,188 | B1 * | 5/2007 | Gai et al. ............................. 1/1 |
| 7,260,558 | B1 | 8/2007 | Cheng et al. |
| 7,506,155 | B1 | 3/2009 | Stewart et al. |
| 7,596,484 | B1 * | 9/2009 | Patel et al. ....................... 703/26 |
| 7,680,783 | B2 * | 3/2010 | Ritter et al. ............. 707/999.004 |
| 7,725,510 | B2 * | 5/2010 | Alicherry et al. ............... 706/48 |
| 7,860,844 | B2 * | 12/2010 | Ebaugh et al. ................ 707/696 |
| 2010/0146623 | A1 * | 6/2010 | Namjoshi et al. ............... 726/23 |

FOREIGN PATENT DOCUMENTS

WO   WO 2011/106800   9/2011

OTHER PUBLICATIONS

International Preliminary Report on Patentability and Written Opinion, mailed Sep. 7, 2012 for International Application No. PCT/US2011/029000, 6 pages.
"Boost C++ Libraries," Wikipedia, last modified Feb. 17, 2010, http://en.wikipedia.org/wiki/Boost_C%2B%2B_Libraries.
Evangelos P. Markatos, et al., "Exclusion-based Signature Matching for Intrusion Detection," XP-002639204, In Proceedings of the IASTED International Conference on Communications and Computer Networks (CCN), Nov. 4, 2002, 6 pages.
International Search Report and Written Opinion mailed Jun. 8, 2011 for International Application No. PCT/US2011/029000.
Jack Shirazi, Optimising Regular Expression Processing, Oct. 26, 2007, XP002639016, retrieved May 25, 2011 from the Internet: URL:http://web.archive.org/web/20071026094515/http://www.fasterj.com/articles/regex2.shtm, 3 pages.

* cited by examiner

*Primary Examiner* — Phillip H Nguyen
(74) *Attorney, Agent, or Firm* — Patent Capital Group

(57) ABSTRACT

A system, method, and computer program product are provided for applying a regular expression to content based on required strings of the regular expression. In use, all required strings included in a regular expression are identified, the required strings including strings required by the regular expression. Additionally, it is determined whether the required strings match content. Furthermore, the regular expression is applied to the content, based on the determination.

17 Claims, 5 Drawing Sheets

SYSTEM, METHOD, AND COMPUTER PROGRAM PRODUCT FOR APPLYING A REGULAR EXPRESSION TO CONTENT BASED ON REQUIRED STRINGS OF THE REGULAR EXPRESSION

FIELD OF THE INVENTION

The present invention relates to regular expressions, and more particularly to applying regular expressions to content.

BACKGROUND

Traditionally, regular expressions are applied to content for determining whether the content matches the regular expressions. In some cases, the regular expressions define characteristics of predetermined types of content (e.g. unwanted content, etc.), such that the regular expressions are applied to content to determine if the content is of a predetermined type. Unfortunately, traditional techniques for applying regular expressions to content have exhibited various limitations.

Just by way of example, simply applying an entirety of a regular expression to content to determine whether there is or is not a match is generally compute-intensive. Moreover, current techniques for reducing such compute-intensive determinations are limited in the amount of instances that such compute-intensive determinates are actually reduced. For example, such techniques conventionally only require a predetermination that a single longest string required by a regular expression be matched to the content prior to applying an entirety of the regular expression to the content. There is thus a need for addressing these and/or other issues associated with the prior art.

SUMMARY

A system, method, and computer program product are provided for applying a regular expression to content based on required strings of the regular expression. In use, all required strings included in a regular expression are identified, the required strings including strings required by the regular expression. Additionally, it is determined whether the required strings match content. Furthermore, the regular expression is applied to the content, based on the determination.

DETAILED DESCRIPTION

Figure 1:
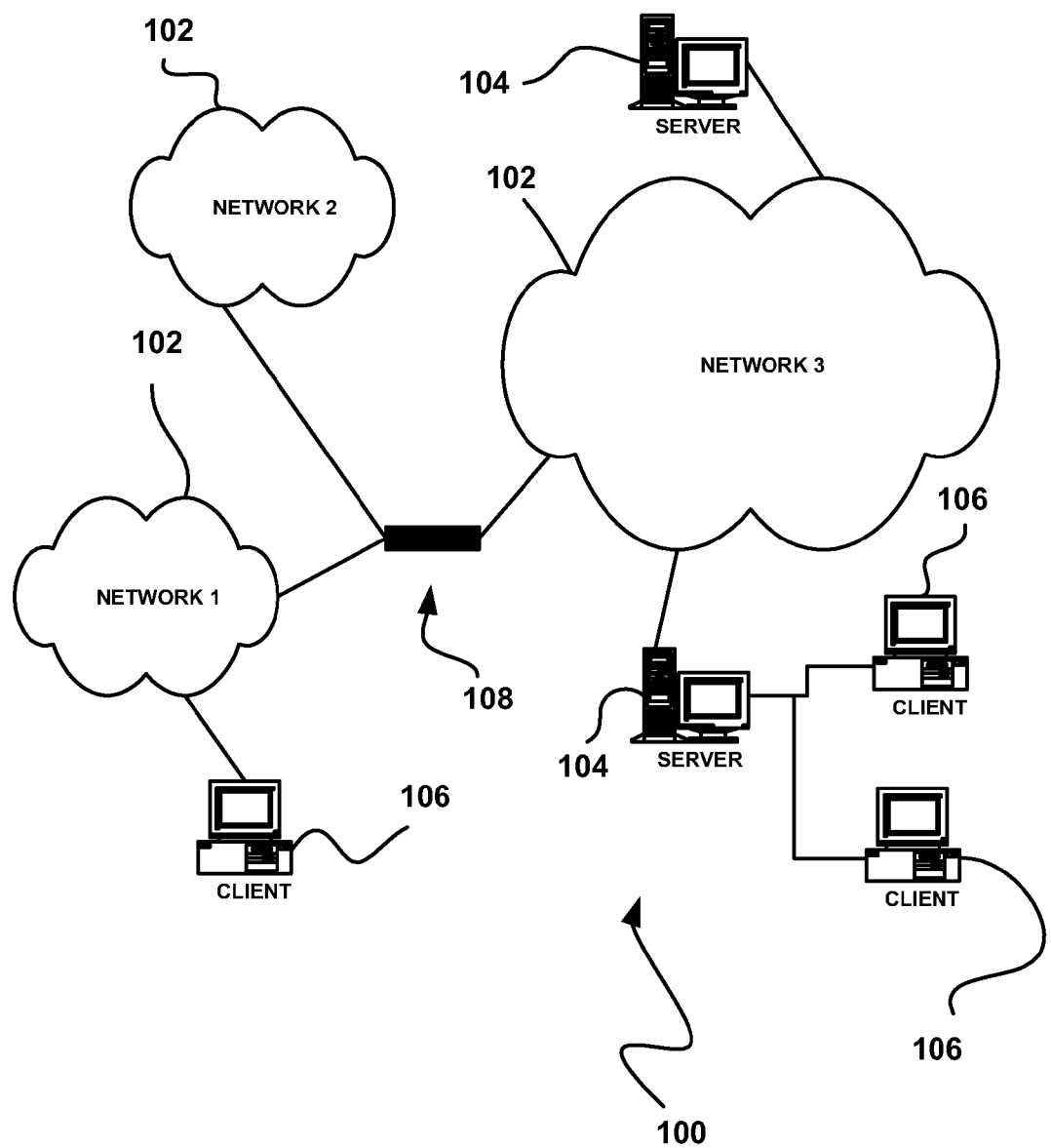
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
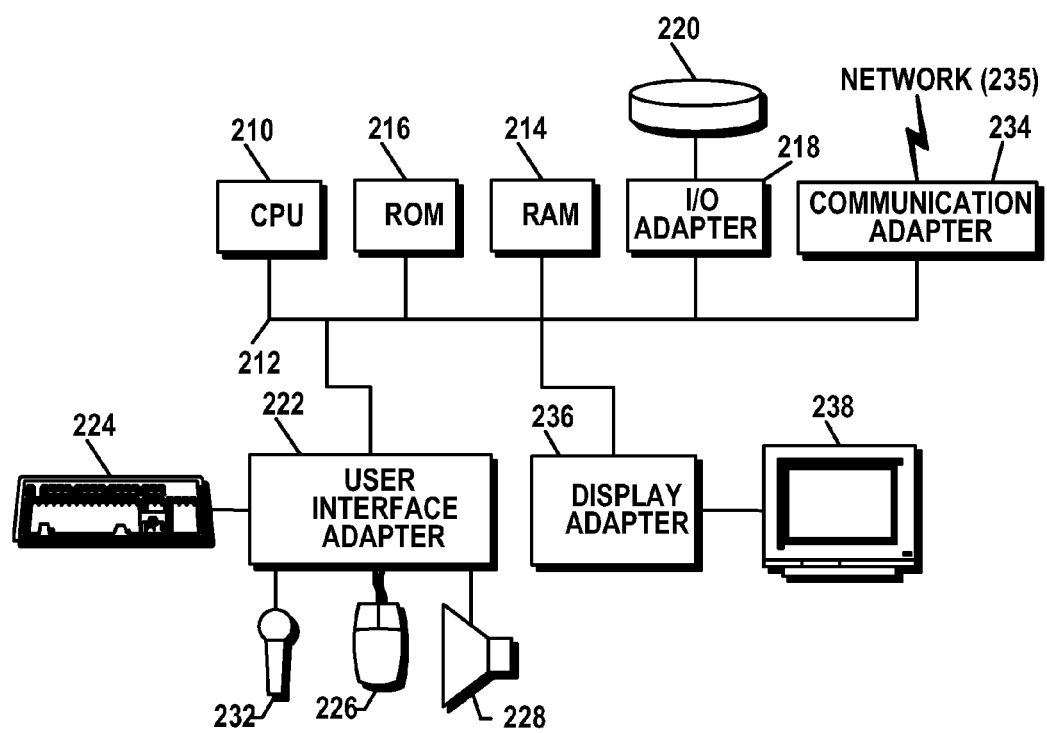
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
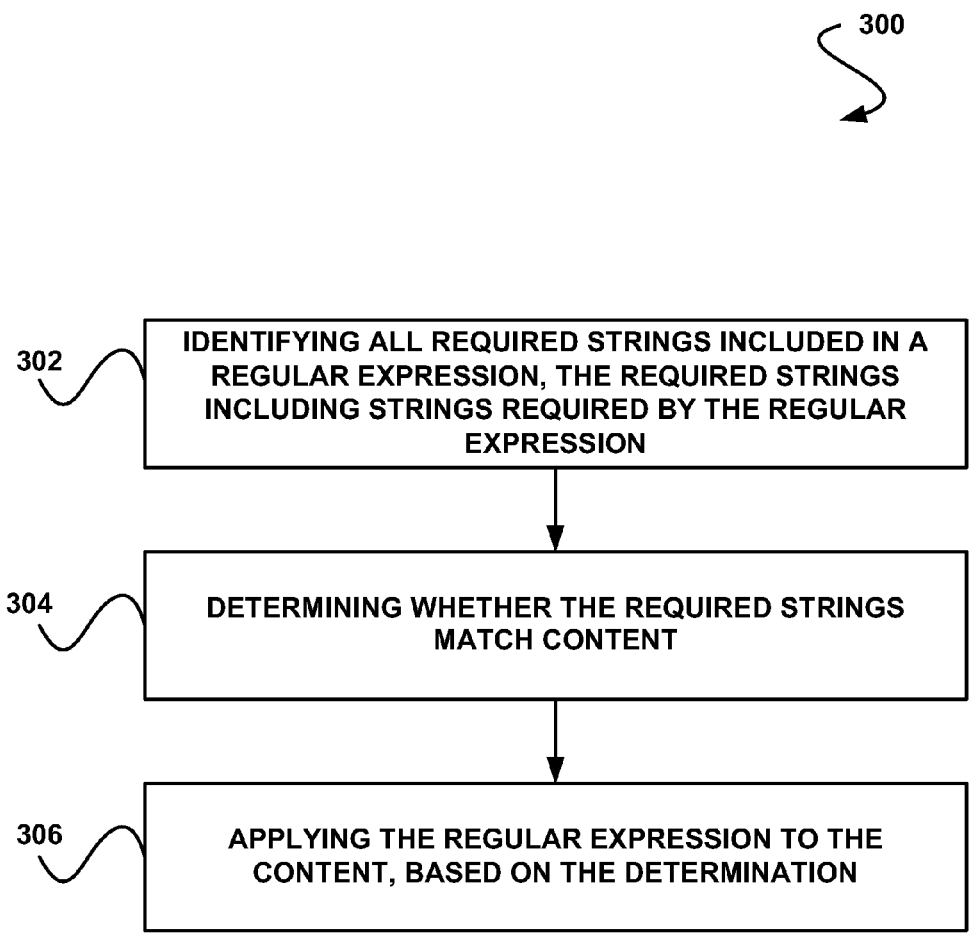
FIG. 3 illustrates a method for applying a regular expression to content based on required strings of the regular expression, in accordance with another embodiment.

FIG. 3 illustrates a method 300 for applying a regular expression to content based on required strings of the regular expression, in accordance with another embodiment. As an option, the method 300 may be carried out in the context of the architecture and environment of FIGS. 1 and/or 2. Of course, however, the method 300 may be carried out in any desired environment.

As shown in operation 302, all required strings included in a regular expression are identified, where the required strings include strings required by the regular expression. With respect to the present description, the regular expression (regex) includes any particular formatting of at least one string for allowing a determination of whether the string(s) match content. Thus, the regular expression may include a single string or a plurality of strings.

In various embodiments, the strings of the regular expression may each include a series of characters or binary values, words, patterns of characters, and/or any other text which may be matched to content. Further, as described in more detail below, the strings may include required strings, optional strings, back references, abstract definitions, groupings (e.g. via an AND operator, an OR operator, etc.), wildcards, etc.

Optionally, the regular expression may indicate characteristics of a predefined type of content (e.g. unwanted content such as malicious content, etc.). For example, each of the strings in the regular expression may be predetermined to be included in a particular type of content. In this way, the regular expression may be utilized for identifying content as being of a particular type (e.g. unwanted, etc.).

As noted above, all required strings (i.e. strings required by the regular expression) included in the regular expression are identified. Namely, such required strings may include strings required to be (e.g. that necessarily must be) included in content in order for the content to be matched to the regular expression. It should be noted that such required strings may be identified in any desired manner.

In one embodiment, the required strings may be identified by parsing the regular expression. For example, the regular expression may be parsed into all strings included therein. In this way, the required strings may be identified from the non-required strings.

In another embodiment, the required strings may be identified by removing optional (non-required) strings from the regular expression. For example, the optional strings may include wildcards. As another example, the optional strings may include strings grouped in the regular expression by an OR operator.

In yet another embodiment, the required strings may be identified by removing quantity operators from the regular expression. Such quantity operators may only require that a subset of a group be matched, for example. In still yet another embodiment, the required strings may be identified by de-escaping all non-special characters.

Optionally, identification of the required strings may be facilitated by removing back references from the regular expression (e.g. when such back references are not used within the regular expression). The back references may include a plain parenthetical set [i.e. ( )] used to create a reference that can be later applied within the same regular expression, such that an abstract grouping may be used and any match of that grouping may be re-used later in the expression. Just by way of example, /(\w)\1/ would match any pair of identical words with a space in between, such as "this this", "you you", but not "this you", etc. To limit it to just "this this" or "you you", /(this|you)\1/may be used which is the same as /this this|you you/.

In one embodiment, the back references may be removed prior to the parsing of the regular expression. In this way, the regular expression may be compiled and validated in response to the removal of the back references, such that the determination of whether the required strings match the content (as described below) may optionally only performed in response to the validation of the regular expression.

As another option, identification of the required strings may be facilitated by removing all abstract definitions from the regular expression. The abstract definitions may include character classes, for example, where a type of character is defined ad hoc with brackets. For example, the type of character may be defined as /[0-9a-fA-F]/, which is any of 0123456789abcdefABCDEF (i.e., Hexadecimal) and where there are shortcuts for that, such as \w=>[0-9a-ZA-Z_], etc. Thus, although the abstract class may include one or more characters of a class that are required, it may be computationally complex to determine the characters of the class that are required ahead of time.

As a further option, the required strings may be identified in response to a determination that each of the required strings exceeds a predetermined length. Thus, only required strings meeting the predetermined length may be identified. It should be noted that the predetermined length may include any length that is preconfigured (e.g. by a user), such as 2 bytes.

Additionally, it is determined whether the required strings match content, as shown in operation 304. With respect to the present description, determining whether the required strings match the content may include determining whether the content includes the required strings as set forth by the regular expression. For example, an order of the required strings within the regular expression may be identified, such that determining whether the required strings match the content may include determining whether the content includes the required strings in the identified order.

In one embodiment, at least one of required strings may be applied to the content in the order in which the required strings exist in the regular expression, for determining whether the required strings match the content. Once it is determined that one of the required strings does not match the content, the remaining required strings in the ordering may not necessarily be applied to the content for determining whether there is a match. Accordingly, remaining ones of the required strings may be avoided from being applied to the content in response to a determination that a last one of the required strings applied to the content does not match the content.

For example, a determination that one of the required strings does not match the content may necessarily indicate that the required strings as a whole will not match the content. To this end, a determination of whether remaining ones of the required strings matches the content may be avoided when a previous one of the required strings in the ordering is determined to not match the content.

In one embodiment, the determination of whether the required strings match the content may be performed utilizing a block of code generated using the required strings. For example, the block of code may be inserted into a driver capable of determining whether content is matched by the regular expression. One example of generating such a block of code will be described in more detail below with respect to FIG. 4.

Furthermore, as shown in operation 306, the regular expression is applied to the content, based on the determination. With respect to the present description, applying the regular expression to the content may include determining whether the content includes all of the strings (required and non-required) as set forth by the regular expression. Thus, the regular expression may be applied to the content, based on the determination of whether the required strings match the content, such that it may be determined whether the content is of the type (e.g. unwanted, etc.) defined by the regular expression.

In one embodiment, the regular expression may not be applied to the content, in response to a determination that at least one of the required strings does not match the content. For example, if one of the required strings does not match the content, it may automatically be determined that the regular expression is incapable of matching the content (i.e. due to the one of the required strings of the regular expression not matching the content). In this way, application of the regular expression to the content may be avoided when it is predetermined that the regular expression is incapable of matching the content. Further, in this manner, a computationally expensive (e.g. resource intensive) application of the regular expression may be avoided.

In another embodiment, the regular expression may be applied to the content, in response to a determination that all of the required strings match the content. For example, determining that all of the required strings match the content may indicate that the regular expression is capable of matching the content. Accordingly, the regular expression may be applied to the content for determining whether the regular expression matches the content, when it is determined that the regular expression is capable of matching the content (i.e. due to the matching of all of the required strings of the regular expression to the content).

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
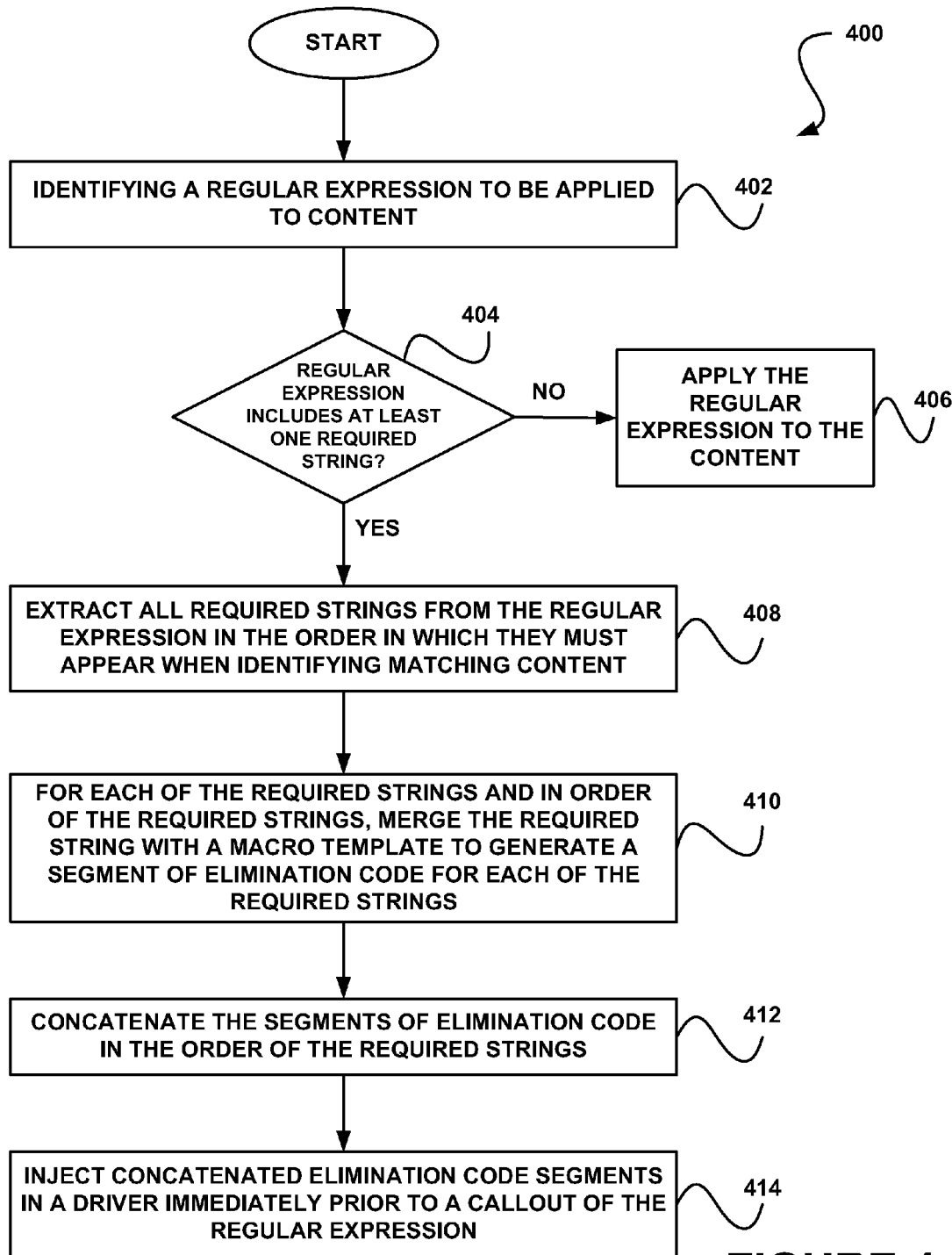
FIG. 4 illustrates a method for updating a driver to apply a regular expression to content based on required strings of the regular expression, in accordance with yet another embodiment.

FIG. 4 illustrates a method 400 for updating a driver to apply a regular expression to content based on required strings of the regular expression, in accordance with yet another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, a regular expression to be applied to content is identified. In one embodiment, the regular expression may be configured by an entity performing the method 400 described herein. In another embodiment, the regular expression may be configured by any third party entity providing the regular expression to the entity performing such method 400. Optionally, the regular expression may be identified by a driver capable of being utilized to apply the regular expression to content (e.g. for applying the regular expression to content).

Additionally, as shown in decision 404, it is determined whether the regular expression includes at least one required string. Optionally, the determination may include determining whether the regular expression includes a required string of at least a predetermined length (e.g. 2 bytes, etc.). In one embodiment, the determination may be made by parsing the regular expression, removing back references, abstract definitions, non-required strings, etc. and determining whether any strings (required strings) remain.

If it is determined that the regular expression does not include at least one required string, the regular expression is applied to the content. Note operation 406. It should be noted that the content may include a file, computer code, text, and/or any other type of content to which a regular expression is capable of being applied. Further, the driver may include a callout to the regular expression, such that the driver may be executed (e.g. without changes being made thereto) for applying the regular expression to the content. To this end, it may be determined whether the regular expression matches the content, based on the application of the regular expression to the content.

If it is determined that the regular expression includes at least one required string, all required strings are extracted from the regular expression in the order in which they must appear when identifying matching content. Note operation 408. As noted above, the regular expression may be parsed, and optionally non-required strings removed from the regular expression, for identifying the required strings. Thus, the identified required strings may optionally be extracted from the regular expression.

As noted above, the required strings are extracted from the regular expression in the order in which they must appear when identifying matching content. With respect to such embodiment, the order may include the ordering of the required strings as set forth by the regular expression. To this end, the extracted required strings may be maintained in the order as that set forth by the regular expression. In one optional embodiment, a length of each of the required strings may also be identified.

Further, as shown in operation 410, for each of the required strings and in order of the required strings, the required string is merged with a macro template to generate a segment of elimination code for each of the required strings. Such template may include any template of macro code (or any other type of code for that matter) into which the required string (and optionally it associated length) may be merged, which is capable of being executed to determine whether the required string matches content. Thus, a separate segment of elimination code may be generated for each of the required strings.

Still yet, the generated segments of elimination code are concatenated in the order of the required strings. Note operation 412. For example, the generated segments of elimination code may be combined utilizing an AND operator between each of the generated segments of elimination code. In this way, a block of code consisting of the generated segments of elimination code may be created. Further, the block of code may be executed to apply each required string to content in the order that the required strings exist in the regular expression.

Moreover, as shown in operation 414, the concatenated elimination code segments are injected in a driver immediately prior to a callout of the regular expression. Thus, an updated driver may be formed by injecting such concatenated elimination code segments into the driver at a point immediately prior to the driver's callout of the regular expression. In this way, the concatenated elimination code may be executed prior to the callout of the regular expression.

As noted above, the macro template is merged with each of the required strings to generate a segment of elimination code for each of the required strings. In one embodiment, the macro template may include elimination code for automatically terminating execution of the updated driver in response a determination that a required string merged with the macro template does not match the content, such that application of the regular expression to the content may be avoided (by avoiding execution of the callout of the regular expression). For example, upon a segment of elimination code determining that the required string merged therewith does not match the content, it may be automatically determined that the regular expression does not match the content, such that any following segments of elimination code in addition to the regular expression may be prevented from being applied to the content. Thus, consumption of resources otherwise occurring due to execution of the following segments of elimination code and the regular expression may be eliminated.

Table 1 shows one example of pseudo-code for generating an updated driver. Of course, it should be noted that such pseudo-code is set forth for illustrative purposes only, and thus should not be construed as limiting in any manner.

TABLE 1

For Each Regular Expression:
    Remove all "Back References" from RegEx when they are not used (to increase performance of the updated driver)
    Compile RegEx (this tests that the RegEx was valid, and still is valid after the removal of the back references)
        IF RegEx Compile Fails => ABORT
    Remove all "Abstract Definitions" from RegEx (e.g. defined character classes)
    Then, pass the following data:
        DATA1: the RegEx
        DATA2: the maximum length allowed by the template (configurable by language & command), e.g., 254 (this limit may be utilized because just about any programming language's functions may have defined limits on their parameter's lengths)
        DATA3: the minimum length to allow for a required string (e.g. 2 bytes)
            i.e., a required string under this minimum length may be discarded
        Remove all Optional groupings from RegEx (non-required strings)
        Remove all OR'd groupings from RegEx
            (when one of a set of strings may be required, no specific ONE is required)
        Remove all wildcards (they are essentially massive OR'd groupings)
        De-Escape all non-special characters (since string-findings are literal)
            (e.g., in Perl a period is represented as "\.", it is changed to just ".")
        Remove quantity operators
            (e.g., /(this){2,3}/ (match 2 or three "this" in a row) becomes /this/ )
        Left->to->Right Parse
            DO
                Search RegEx for a String of Length >= DATA3
                Push that String onto the Stack of Ordered Required Strings
                Remove that String from the RegEx
            LOOP if Any String was Found on This Pass
        With an empty Elimination Segments . . .
        FOR EACH Ordered Required String
            Merge This String and String Length into the Macro-Template as Elimination Segment
                (Meaning "Search for String"; it also uses the string's length to jump past any string when found (so time is not wasted re-searching through the same data))
            Concatenate this Elimination Segment onto Elimination Segments
            LOOP while any strings are left
        Insert the Elimination Segments into Driver Immediately before RegEx callout
LOOP if any RegEx remain Table 2 shows on example of a regular expression that may be utilized for updating a driver. Further, Table 3 shows the required strings that may be extracted from the regular expression of Table 3. Again, it should be noted that the examples set forth in Tables 2 and 3 are for illustrative purposes only, and thus should not be construed as limiting in any manner.

TABLE 2

RegEx: /\<object\s+type=\"text\/x-scriptlet\"\s+data=\S*\s+align=\"[a-z]+\"\s+width=\"[\d\%]+\"\s+height=\"[\d\%]+\"\>big/i

TABLE 3

"<object","type=","text/x-scriptlet","data=","align=","width=","height=","big"

Table 4 illustrates various string formats that may be utilized by a regular expression. Table 5 illustrates the required strings that may be extracted from the regular expression of Table 4. Again, it should be noted that the examples set forth in Tables 4 and 5 are for illustrative purposes only, and thus should not be construed as limiting in any manner.

TABLE 4

/this/ => look for the lower-case string "this" anywhere in content
/this|that/ => look for either "this" or "that" anywhere in content ("|" means "or")
/th(is|at)/ => same as above; parentheses denote a "group"
/do(ugh)?na?u(gh)?t/ => "?" means (or or one of); this looks for "do", followed optionally by "ugh"; regardlessly followed by "u", followed by an optional "gh"; regardlessly followed by "t" (i.e., "donut" or "doughnaught"), but also "donught", "donaut", "donaught", "doughnut", "doughnught", "doughnaut")
/Kim\s[A-Z][a-z]+\s*$/ => "Kim", followed by a whitepace ("space", "tab", etc.), followed by one upper-case letter, followed by one-or-more lower-case letters; followed by any number of whitespace (if any) and an end-of-line; (i.e., looking for any Full Names where the first name is "kim" and there is something like a last name afterwards: would match "this is Kim Kong", but not "wonder who kim is", and would fail to catch "Kim McCrackin", etc.)

TABLE 4-continued

/log\s+onto\s+(http:\/\/)?www\.hackme\.com\/exploit\.(php|pl|exe)/ => looks for things like "log onto http://www.hackme.com/exploit.php" or similar

TABLE 5

| | |
|---|---|
| /this/ | => 1:"this" |
| /this\|that/ | => n/a, no required strings |
| /th(is\|at)/ | => 1:"th" |
| /do(ugh)?na?u(gh)?t/ | => 1:"do" (if minimum string length is set to 2) |
| /Kim\s[A-Z][a-z]+\s*$/ | => 1:"Kim" |
| /log\s+onto\s+http:\/\/www\.hackme\.com\/exploit\.(php\|pl\|exe)/ | => 1:"log",2:"onto",3:"www.hackme.com",4:"exploit" |

While various embodiments have been described above in which the segments of elimination code are implemented in software (i.e. the driver as described above), it should be noted that the segments of elimination code may also be implemented in hardware as logic. For example, the logic may include a library in hardware [e.g. a field-programmable gate array (FPGA)] that may include a condition for returning to calling code for executing the regular expression. Such hardware implementation may be utilized when the regular expression is utilized for inline filtering, a sniffer on a telecommunications network, etc.

Figure 5:
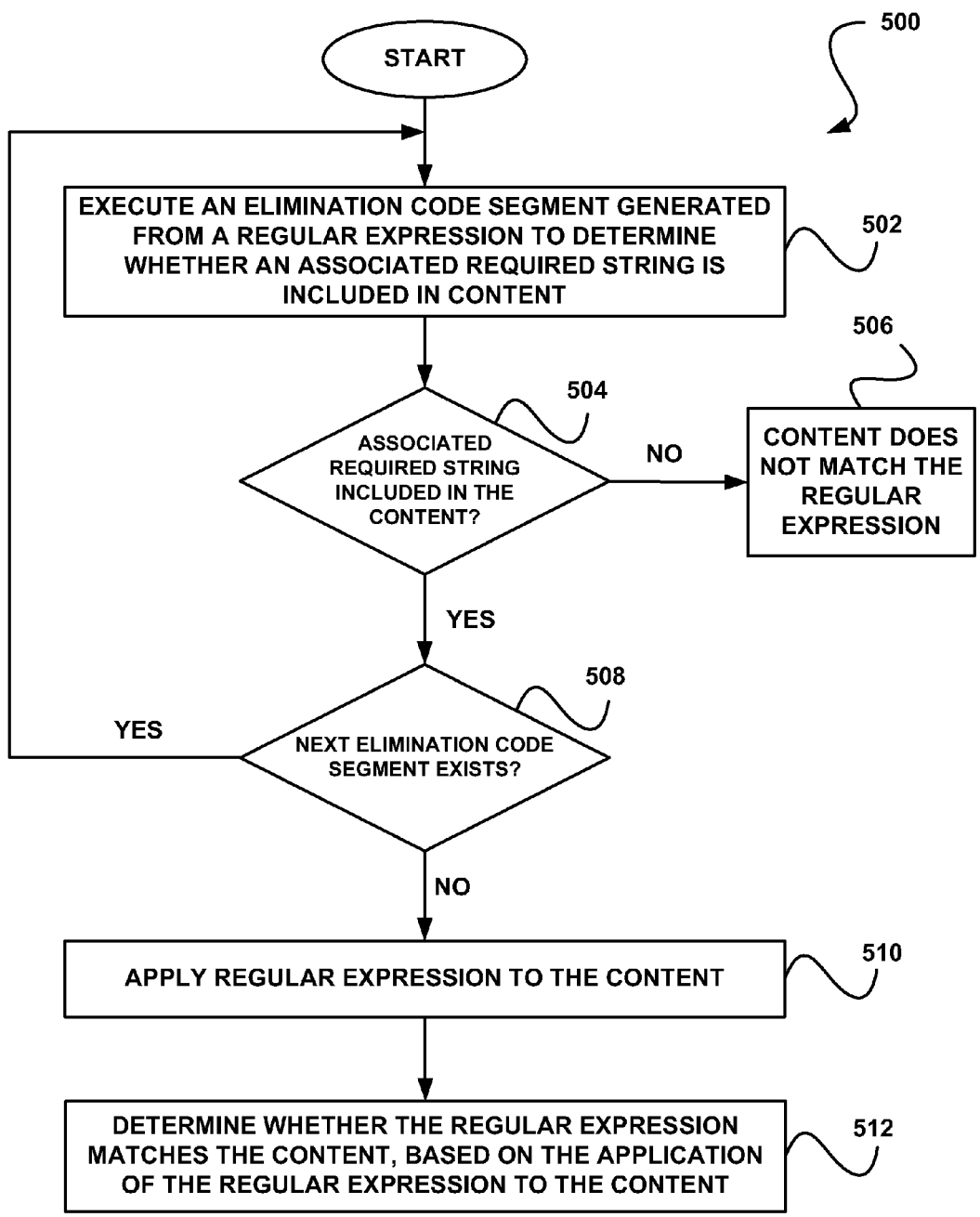
FIG. 5 illustrates a method for determining whether a regular expression matches content, in accordance with still yet another embodiment.

FIG. 5 illustrates a method 500 for determining whether a regular expression matches content, in accordance with still yet another embodiment. As an option, the method 500 may be carried out in the context of the architecture and environment of FIGS. 1-4. For example, the method may be carried out utilizing the updated driver described above with respect to FIG. 4. Of course, however, the method 500 may be carried out in any desired environment. It should also be noted that the aforementioned definitions may apply during the present description.

As shown in operation 502, an elimination code segment generated from a regular expression is executed to determine whether an associated required string is included in content. Such associated required string may include a required string that was merged with a template of code for form the elimination code segment. Upon initial execution of the method 500, the elimination code segment may include a first elimination code segment in a series of concatenated elimination code segments. For example, the first elimination code segment may include a first required string existing in the regular expression.

It is then determined whether the required string associated with the elimination code segment is not included in the content, based on the execution of the elimination code segment, it is determined that the content does not match the regular expression. Note operation 506. Thus, the method 500 may accordingly terminate.

If, however, it is determined that the required string associated with the elimination code segment is included in the content, based on the execution of the elimination code segment, it is determined whether a next elimination code segment exists. Note decision 508. For example, it may be determined whether another elimination code segment exists in the series of concatenated elimination code segments.

In response to a determination that a next elimination code segment exists, such next elimination code segment is executed (operation 502) for determining whether the required string associated therewith is included in the content (decision 504). Thus, each elimination code segment may be executed in the order in which they are concatenated so long as the previously executed elimination code segments have determined that the associated required strings match the content. If any required string of an elimination code segment is determined to not match the content, it is determined that the content does not match the regular expression (operation 506).

Once it is determined that a next elimination code segment does not exist (and that all previously executed elimination code segments have had required strings matching the content), the regular expression is applied to the content, as shown in operation 510. Thus, the regular expression may be applied to the content as a result of a determination that all required strings of the regular expression have been matched with the content via the execution of the elimination code segments.

Further, it is determined whether the regular expression matches the content, based on the application of the regular expression to the content, as shown in operation 512. In this way, the regular expression may only be applied to the content in response to a determination that all required strings of the regular expression match the content, and thus that the regular expression is capable of matching the content.

Optionally, any action may be taken based on the determination of whether the regular expression matches the content. Such action may be based on a predetermined policy. Just by way of example, if the regular expression is utilized for identifying unwanted content (e.g. viruses), the content may be discarded, quarantined, filtered, etc. in response to a determination that the regular expression matches the content.

Table 6 shows one example of the run-time logic (execution) of the driver updated using the pseudo-code shown in Table 1 based on the required strings shown in Table 3 of the regular expression shown in Table 2. Of course, it should be noted that such run-time logic is set forth for illustrative purposes only, and thus should not be construed as limiting in any manner.

TABLE 6

Search for "<object"
Quit if not found
Jump to the "t" in "object" in DATA
Search for "type="
Quit if not found
Jump to the "=" in "type=" in DATA
Search for "text/x-scriptlet"
Quit if not found
Jump to the ending "t" in "text/x-scriptlet" in DATA
Search for "data="
Quit if not found
Jump to the "=" in "data=" in DATA
Search for "align="
Quit if not found
Jump to the "=" in "align=" in DATA
Search for "width="
Quit if not found
Jump to the "=" in "width=" in DATA
Search for "height="
Quit if not found
Jump to the "=" in "height=" in DATA
Search for "big"
Quit if not found
Jump to the Beginning of DATA
Apply RegEx
...continue with driver as normal...

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a tangible computer readable medium, comprising:
    computer code for identifying all required strings included in a regular expression, the required strings including strings required by the regular expression;
    computer code for determining whether the required strings match content;
    computer code for applying the regular expression to the content, based on the determination;
    computer code for merging each of the required strings and its associated length into a separate template of code to generate a segment of code;
    computer code for concatenating the generated segments of code in an order of the required strings; and
    computer code for injecting the concatenated segment of code in a driver prior to a callout of the regular expression to form an updated driver.

2. The computer program product of claim 1, wherein the computer program product is operable such that the required strings are identified by parsing the regular expression.

3. The computer program product of claim 1, wherein the computer program product is operable such that the required strings are identified by removing optional strings from the regular expression.

4. The computer program product of claim 3, wherein the optional strings include wildcards.

5. The computer program product of claim 1, wherein the computer program product is operable such that the required strings are identified by removing quantity operators from the regular expression.

6. The computer program product of claim 1, wherein the computer program product is operable such that the required strings are identified by removing back references from the regular expression when the back references are not used by the regular expression.

7. The computer program product of claim 6, wherein the computer program product is operable such that the regular expression is validated in response to the removal of the back references, such that the determination of whether the required strings match the content is only performed in response to the validation of the regular expression.

8. The computer program product of claim 1, wherein the computer program product is operable such that the required strings are identified in response to a determination that each of the required strings exceeds a predetermined length.

9. The computer program product of claim 1, further comprising computer code for identifying a length of each of the required strings.

10. The computer program product of claim 1, wherein the template of code includes elimination code for automatically terminating execution of the updated driver in response a determination that a required string merged with the template of code does not match the content, such that application of the regular expression to the content is avoided.

11. The computer program product of claim 1, further comprising computer code for applying at least one of required strings to the content in an order in which the required strings exist in the regular expression, for determining whether the required strings match the content.

12. The computer program product of claim 11, further comprising computer code for avoiding applying remaining ones of the required strings in response to a determination that a last applied one of the required strings does not match the content.

13. The computer program product of claim 1, wherein the computer program product is operable such that the regular expression is not applied to the content, in response to a determination that at least one of the required strings does not match the content.

14. The computer program product of claim 1, wherein the computer program product is operable such that the regular expression is applied to the content, in response to a determination that all of the required strings match the content.

15. A method, comprising:
    identifying all required strings included in a regular expression, the required strings including strings required by the regular expression, utilizing a processor;
    determining whether the required strings match content;
    applying the regular expression to the content, based on the determination;
    merging each of the required strings and its associated length into a separate template of code to generate a segment of code;
    concatenating the generated segment of code in an order of the required string; and
    injecting the concatenated segment of code in a driver prior to a callout of the regular expression to form an updated driver.

16. A system, comprising:
    a processor, wherein the system is configured for:
        identifying all required strings included in a regular expression, the required strings including strings required by the regular expression,
        determining whether the required strings match content,
        applying the regular expression to the content, based on the determination,
        merging each of the required strings and its associated length into a separate template of code to generate a segment of code;
        concatenating the generated segment of code in an order of the required string; and
        injecting the concatenated segment of code in a driver prior to a callout of the regular expression to form an updated driver.

17. The system of claim 16, wherein the processor is coupled to memory via a bus.

* * * * *